US006933763B2

(12) United States Patent
Gajdardziew Radelinow

(10) Patent No.: US 6,933,763 B2
(45) Date of Patent: Aug. 23, 2005

(54) DEVICE AND HIGH SPEED RECEIVER INCLUDING SUCH A DEVICE

(75) Inventor: Andrzej Gajdardziew Radelinow, Deurne (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/773,173

(22) Filed: Feb. 9, 2004

(65) Prior Publication Data

US 2004/0174191 A1 Sep. 9, 2004

(30) Foreign Application Priority Data

Feb. 10, 2003 (EP) ........................................... 03290323

(51) Int. Cl.[7] ................................................ H03L 5/00
(52) U.S. Cl. ........................................... 327/307; 330/9
(58) Field of Search ............................... 327/307; 330/9

(56) References Cited

U.S. PATENT DOCUMENTS 5,154,066 A 10/1992 Choi
6,288,604 B1 * 9/2001 Shih et al. ..................... 330/9
2002/0109075 A1 8/2002 Ono

FOREIGN PATENT DOCUMENTS

EP 1 067 691 A1 1/2001

* cited by examiner

*Primary Examiner*—Kenneth B. Wells
(74) *Attorney, Agent, or Firm*—Sughrue Mion, PLLC

(57) ABSTRACT

The present invention is related to a device comprising, between a differential pair of inputs, a differential pre-amplifier (HPA1, HPA2), an offset-reducing block (ORB) cascaded with said differential pre-amplifier (HPA1, HPA2) and arranged for reducing the offset generated by said differential pre-amplifier, and a buffering block (BB) in series with said offset-reducing block (ORB) and arranged for amplifying and buffering the output voltage of said offset-reducing block.

10 Claims, 4 Drawing Sheets

DEVICE AND HIGH SPEED RECEIVER INCLUDING SUCH A DEVICE

FIELD OF THE INVENTION

The present invention is related to a device and a high-speed receiver including such a device, which can for instance be used for communication of serial binary data over a copper line, according to the Low Voltage Differential Signalling method.

STATE OF THE ART

Low Voltage Differential Signalling (LVDS) is a method for high-speed serial transmission of binary data over a copper transmission line. It is widely adopted in telecom equipment requiring high bandwidth data and clock transfer because of its immunity to crosstalk noise, low electromagnetic interference and low power dissipation. As telecom and networking systems move towards multi-Gb/s rates, maintaining adequate signal integrity becomes the bottleneck for system expansion. The use of optical interconnections is still limited due to their high cost, while copper transmission lines still provide a cost-effective alternative. The main cause of inter-symbol interference in the high-speed serial links is the attenuation and the dispersal of frequency components resulting from the signal propagation down a transmission line. Data pulses respond to these effects with a loss of amplitude and displacement in time. This results in signal skew (jitter) at the input of the receiving LVDS device, increasing the bit error rate of the link. In the Gb/s range the deterministic jitter occupies a significant part of the receiver input data eye for typical interconnection lengths, setting hard requirements for the LVDS receiver in terms of jitter contribution. The increasing number of backplane interconnections significantly increases the board crosstalk noise. The power supply interference is another concern since the number of serial links per ASIC is continuously increasing.

The original LVDS standard ANSI/TIA/EIA-644 specifies rail-to-rail common-mode range of the receiver. Although the common-mode disturbance might have lower amplitude, it is important to guarantee full common-mode range and good common-mode rejection. Since the original LVDS standard was defined for 2.5V devices and lower bit rates, it is impossible to design a fully compliant LVDS transceiver in a state-of-the-art 1.2V process.

A common technique allowing rail-to-rail common-mode range is the use of complementary NMOS-PMOS input stages with overlapped active regions. Although a 1.2V digital CMOS process is convenient for high-speed designs, it puts limitations on the number of MOS devices stacked between the supply rails.

The closest prior art solution, as described in patent EP 1 067 691 A1, will experience problems at a supply voltage of about 1V (used in 0.13 $\mu$m CMOS technologies), because the presence of the current source in the prior art embodiment gives in the transistor implementation an additional level in the number of stacked devices (at least 3). Moreover, this transistor level implementation of the current source is difficult in a low-voltage process when none of the current source terminals is grounded. The current source implementation would add additional capacitive load to the circuit nodes, reducing the speed and increasing the data dependent jitter. It would also cause variation of the differential gain and propagation delay at different common-mode levels.

The prior art solution requires a high-speed voltage comparator to be used together with two identical input stages.

Furthermore, the prior art implementation is relatively complex in terms of numbers of transistors required.

Aims of the Invention

The present invention aims to provide a receiver structure that does not have the drawbacks of the state of the art. It also aims to provide a receiver structure, which can be processed in advanced technologies (requiring a low supply voltage), while at the same time being simple and solving the problems of speed, reduced dynamic range, and differential gain.

SUMMARY OF THE INVENTION

The present invention is related to a device comprising, between a differential pair of inputs, consisting of a first input and a second input, and an output, a differential pre-amplifier. The device further comprises

- an offset-reducing block cascaded with said differential pre-amplifier and arranged for reducing the offset generated by said differential pre-amplifier, and
- a buffering block in series with said offset-reducing block and arranged for amplifying and buffering the output voltage of said offset-reducing block.

In an advantageous embodiment the differential pre-amplifier comprises a first and a second half pre-amplifier, each of said half pre-amplifiers having a first and a second input and an output, the outputs of said half pre-amplifiers being coupled together to form an input to said offset-reducing block.

In a specific embodiment the first input of said first half pre-amplifier is coupled to a first input of said device, whilst the second input of said first half pre-amplifier is coupled to the second input of said device. The first input of said second half pre-amplifier is coupled to the first input of said device, whilst the second input of said second half pre-amplifier is coupled to the second input of said device.

Advantageously, the offset-reducing block comprises a transimpedance circuit, that preferably comprises a resistance and an inverter stage.

According to a specific embodiment the offset-reducing block additionally comprises means for equalisation. Said means for equalisation comprises a RC network.

In another embodiment the buffering block comprises means for amplification and pulse shaping.

In a specific embodiment the means for amplification and pulse shaping comprises an inverter circuit.

In a particular embodiment the invention relates to a receiver structure comprising a device as previously described.

SHORT DESCRIPTION OF THE DRAWINGS

DETAILED DESCRIPTION OF THE INVENTION

Figure 1:
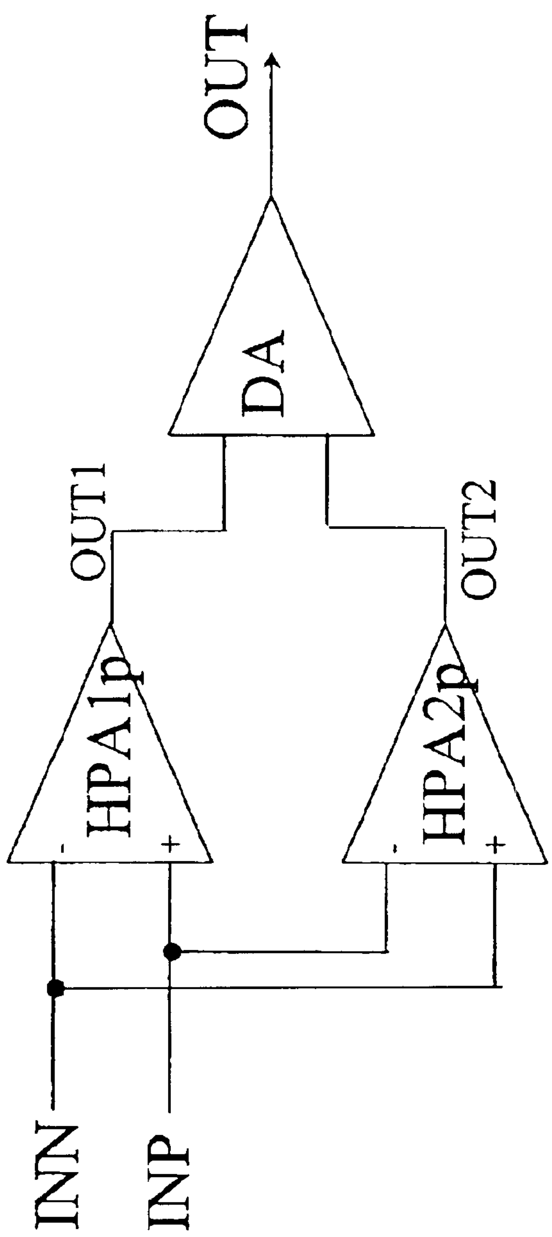
FIG. 1 represents the prior art solution.
Figure 2:
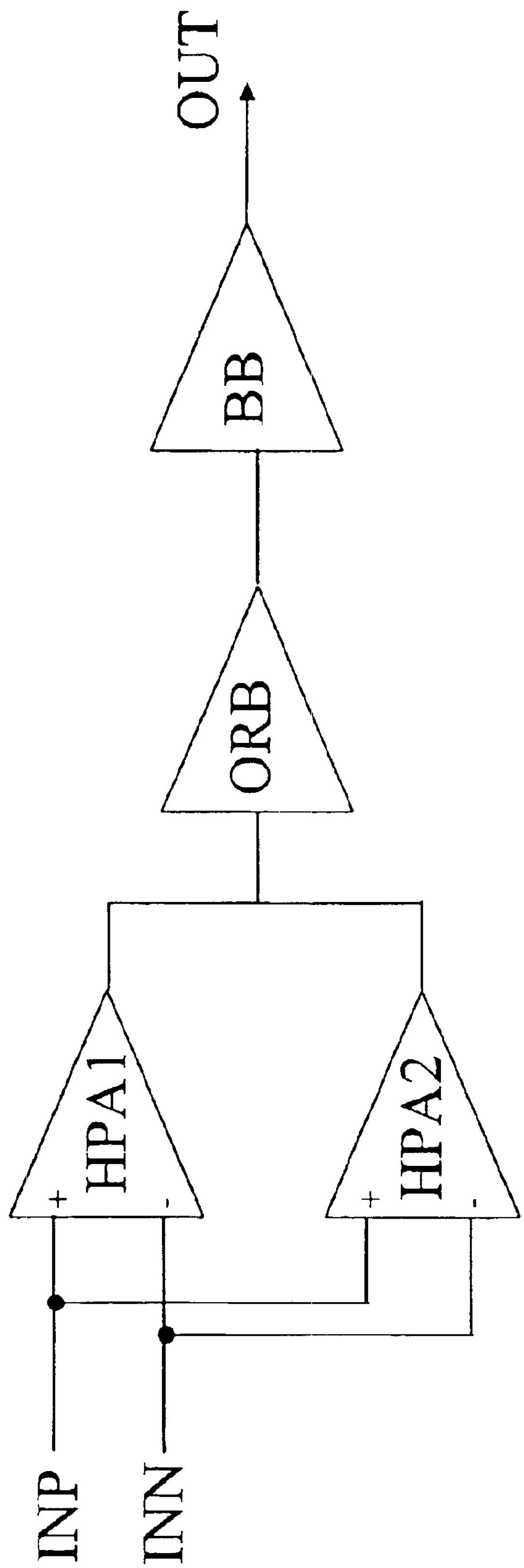
FIG. 2 represents the solution according to the invention.

The prior art solution is shown in FIG. 1 and the structure of the invention in FIG. 2. In the prior art, the pre-amplifier block was followed by a comparator for comparing two incoming voltages (outputs of both half amplifiers). In the present invention, such a comparator block is no longer present, but is replaced by an offset-reducing block followed by a buffering block. Such an offset-reducing block, in a preferred embodiment consisting of a transimpedance stage, is now adapted to reduce the offset originating from the previous stage consisting of two half-amplifiers, by forcing its sole input voltage being the output voltage of both output terminals of both amplifiers coupled together, to a fixed threshold. The buffering stage BB, in its most simple implementation consisting of an inverter INV, is performing amplification and pulse shaping.

The inputs INN and INP to the two 'half amplifiers' (HPA1*p* and HPA2*p*) of the prior art are cross-connected in order to generate complementary output signals (i.e. with 180 degrees phase shift), while in the invention they are in phase. The outputs of both half amplifiers are separated in the prior art, whereas now they are coupled together.

Figure 3:
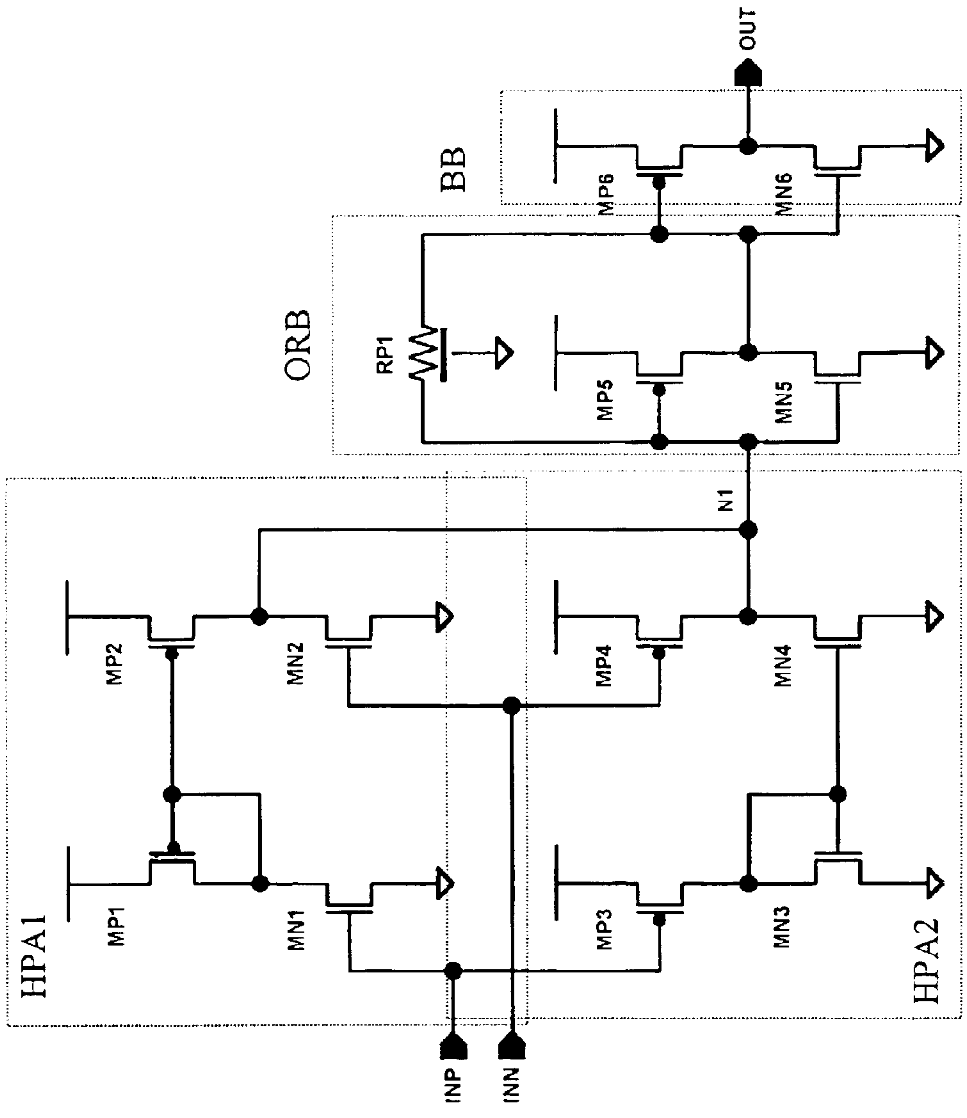
FIG. 3 represents a first transistor level implementation of the invention.
Figure 4:
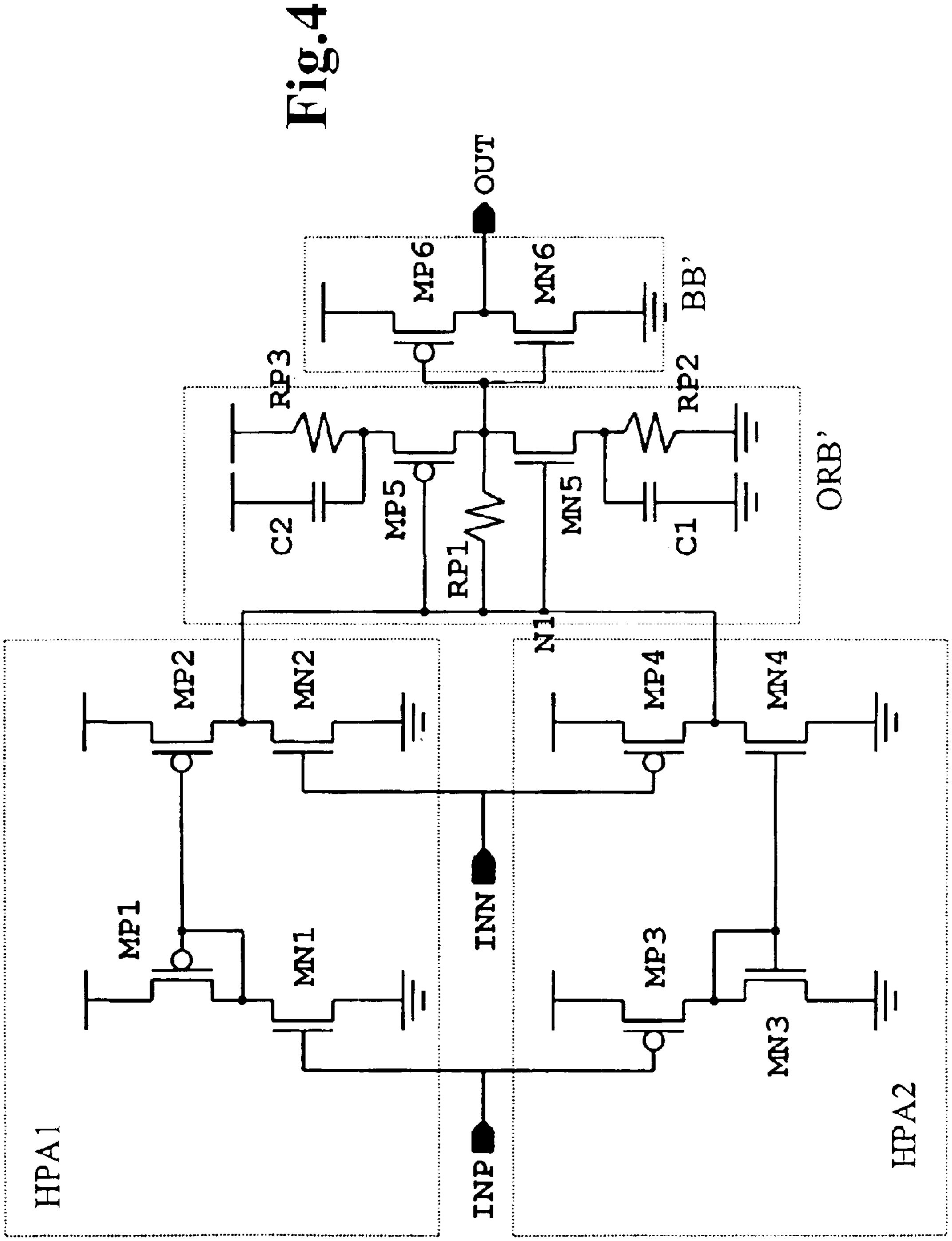
FIG. 4 represents a second transistor level implementation including the optional equalisation.

Detailed embodiments of the device will now be described, with reference to FIGS. 3 and 4. It is to be remarked that, although the figures depict implementations in a CMOS technology, embodiments in other technologies such as bipolar, BICMOS, III–V and other technologies are as well possible. In this case the MOS transistors depicted in FIGS. 3 and 4 are to be replaced by the appropriate bipolar or other active devices, as is well known to a person skilled in the art. In the remainder of this document, a MOS implementation will be described into more detail.

The receiver device structure according to the invention is designed for a low-voltage technology, such as an advanced CMOS technology. In such technologies the short-channel effect in sub-micrometer CMOS processes causes linearisation of the MOS quadratic characteristic, improving the similarity of the NMOS and PMOS $I_{DS}(V_{GS})$ (drain current as function of the gate to source voltage) characteristics. Since the low supply voltage and the linear $I_{DS}(V_{GS})$ characteristic limit the maximum drain current to practical values, it is possible to implement a grounded source input differential stage without additional current sources, improving the input dynamic range. An additional advantage of this structure is the fact that the required slew-rate is achieved with smaller W/L values (with W denoting width and L length), as more gate-overdrive voltage is available. Because the function of the input stage is conversion from differential input to single-ended 'digital' output, its most important parameter is the common-mode rejection. Once this conversion is done in a proper way, one can provide the necessary gain in the single-ended domain by simple inverters. It is important to maintain a low voltage gain in the input stage in order to avoid saturation memory effects, causing data dependent jitter. In the proposed simplified topology as shown in FIG. 3, the input PMOS and NMOS stages have the property of rejecting the input common-mode component. The input transistors are scaled in such a way that the voltage at node N1 is at nearly half-supply level, when the differential input component $V_{inp}-V_{inn}=0$ and the common-mode component $0<V_{CM}<V_{DD}$.

An implementation of the offset-reducing block (ORB) consists of a transimpedance stage, including MN5, MP5 and RP1. The stage is driven by the input current and generates an output voltage and is such that the feedback current generated by it is able to compensate the offset of both pre-amplifiers. Therefore the feedback current, determined by resistance RP1, the output current capability of the stage MN5-MP5 and the gain of this stage, has to be high enough to compensate the output offset current of both half pre-amplifiers. The output offset may be caused by transistor mismatch. Note that the offset-reducing block (ORB) has a frequency dependent input impedance. The relatively low input resistance of the transimpedance stage also equalises the voltage gains at both sides of the current mirrors MN3, MN4 and MP3, MP4 so the channel length modulation in the mirrored currents is not degrading the receiver common-mode rejection.

Another specific feature of the invention is the fact that the input capacitance of the stage MN6-MP6 reduces the high-frequency gain of the transimpedance stage MN5-MP5 and thus increases its input impedance $Z_{IN\_TI}$:

$$Z_{IN\_TI} = \frac{R}{1 - A_{CL}},$$

with $A_{CL}$ denoting the closed loop small signal gain of the transimpedance stage and R the resistance of the feedback resistor RP1.

The increase of $Z_{IN\_TI}$ causes high-frequency peaking of the input stage gain. This is equivalent to bandwidth increase in comparison to the prior art. The increased bandwidth reduces the data dependent jitter generation and increases the maximum speed of the receiving device. This is also in contrast to the prior art, where the maximum bandwidth is lower.

As an option, the invention may easily include an enhanced equalisation, consisting of a frequency correction function in the frequency domain. An embodiment of such an implementation is shown in FIG. 4, whereby the low-pass behaviour of the channel is compensated and the deterministic jitter is cancelled by the addition of the resistors RP2,RP3 and the capacitors C1 and C2 to the original transimpedance block OB of FIG. 3. The resulting offset-reducing block is denoted OB'. This enhanced behaviour results in an output eye diagram opening wider than the input eye opening for deterministic jitter. The equalisation is implemented as transconductance degeneration in the transimpedance stage MN5-MP5. The degenerated small signal transconductance of the inverter comprising MN5-MP5 is:

$$G_{mINV} = \frac{2 \cdot g_m}{1 + g_m \cdot Z_S}$$

where $Z_s$ is the impedance of the RC source networks (C1, RP2 and C2, RP3) and $g_m$ is the transconductance of the transistors MN5, MP5 if $Z_s=0$. Because the impedance of these RC source networks is decreasing as frequency increases, the gain is proportional to the frequency. This frequency correction compensates the low-pass response of the channel and reduces the deterministic jitter at the output. Note however that other implementations than that proposed in FIGS. 3 and 4 can be envisaged.

The implementation of the invention is much more simple that the prior art one. It implies coupling serially as few devices as possible between the supply terminals in order to allow minimum supply voltage operation. Furthermore, the grounded source input structure avoids the creation of common-mode poles, leading to a lower variation of the differential gain and propagation delay on common-mode extremes and to an increased dynamic range.

What is claimed is:

1. A device comprising, between a differential pair of inputs, consisting of a first input (INN) and a second input (INP), and an output (OUT), a differential pre-amplifier (HPA1, HPA2), characterised in that said device further comprises an offset-reducing block (ORB) cascaded with said differential pre-amplifier (HPA1, HPA2) and arranged for reducing the offset generated by said differential pre-amplifier, and in that said device further comprises a buffering block (BB) in series with said offset-reducing block (ORB) and arranged for amplifying and buffering the output voltage of said offset-reducing block.

2. The device as in claim 1, characterised in that said differential pre-amplifier comprises a first (HPA1) and a second (HPA2) half pre-amplifier, each of said half pre-amplifiers having a first (+) and a second (−) input and an output, the outputs of said half pre-amplifiers being coupled together to form an input to said offset-reducing block (ORB).

3. The device as in claim 2, characterised in that the first input (+) of said first half pre-amplifier (HPA1) is coupled to a first input (NP) of said device, whilst the second input (−) of said first half pre-amplifier (HPA1) is coupled to the second input (INN) of said device, and in that the first input (+) of said second half pre-amplifier (HPA2) is coupled to the first input (NP) of said device, whilst the second input (−) of said second half pre-amplifier (HPA2) is coupled to the second input (INN) of said device.

4. The device as in claim 1, characterised in that said offset-reducing block (ORB) comprises a transimpedance circuit.

5. The device as in claim 4, characterised in that said transimpedance circuit comprises a resistor (RP1) and an inverter stage (MP5-MN5).

6. The device as in claim 1, characterised in that said offset-reducing block (ORB) additionally comprises means for equalisation.

7. The device as in claim 6, characterised in that said means for equalisation comprises an RC network.

8. The device as in claim 1, characterised in that said buffering block (BB) comprises means for amplification and pulse shaping.

9. The device as in claim 8, characterised in that said means for amplification and pulse shaping comprises an inverter circuit (MN6-MP6).

10. A receiver structure comprising a device as in claim 1.

* * * * *